(12) United States Patent
Steadman

(10) Patent No.: US 6,302,468 B1
(45) Date of Patent: Oct. 16, 2001

(54) COVER APPARATUS

(75) Inventor: William David Steadman, Port Saint Lucie, FL (US)

(73) Assignee: William Steadman, Port Saint Lucie, FL (US)

( * ) Notice: Subject to any disclaimer, the term of this patent is extended or adjusted under 35 U.S.C. 154(b) by 0 days.

(21) Appl. No.: 09/636,109

(22) Filed: Aug. 10, 2000

Related U.S. Application Data

(60) Provisional application No. 60/150,678, filed on Aug. 25, 1999.

(51) Int. Cl.[7] .................................................... B60P 7/02
(52) U.S. Cl. ................................ 296/100.04; 296/100.07; 296/100.09
(58) Field of Search .................. 296/100.02, 100.06, 296/100.07, 100.09, 100.04, 37.6, 100.03

(56) References Cited

U.S. PATENT DOCUMENTS

| | | | |
|---|---|---|---|
| 2,086,091 | * 7/1937 | Payette | 296/100.09 |
| 3,768,858 | * 10/1973 | Bosimier | 296/100.09 |
| 3,986,749 | * 10/1976 | Hull et al. | 296/100.09 |
| 4,747,441 | * 5/1988 | Apolzer et al. | 296/100.09 X |
| 4,946,217 | * 8/1990 | Steffens et al. | 296/100.09 |
| 5,427,428 | * 6/1995 | Ericson et al. | 296/98 |
| 5,653,491 | * 8/1997 | Steffens et al. | 296/100.09 |

* cited by examiner

*Primary Examiner*—Stephen T. Gordon
*Assistant Examiner*—Patricia Engle
(74) *Attorney, Agent, or Firm*—Watts, Hoffman, Fisher & Heinke Co LPA

(57) ABSTRACT

Apparatus 10 to cover the load area of a pick-up truck. The apparatus 10 comprising a number of pivotally interconnected panels 28 extending between a pair of tracks 14. The panels 28 are moveable between a closed position with the panels 28 extending in a generally co-planar manner, and an open position where the panels 28 are folded to lie substantially against each other extending upwardly away from the tracks 14.

25 Claims, 3 Drawing Sheets

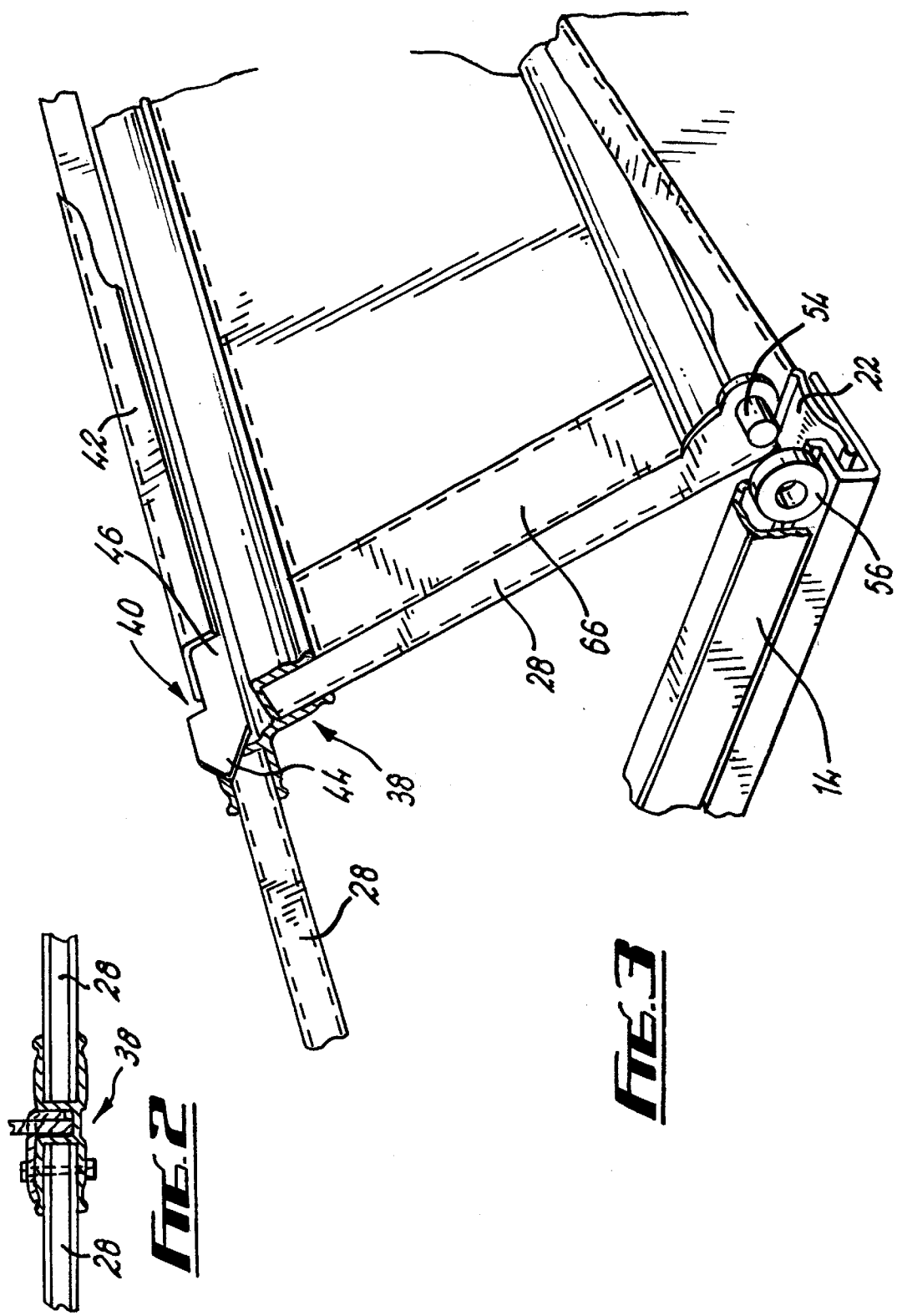

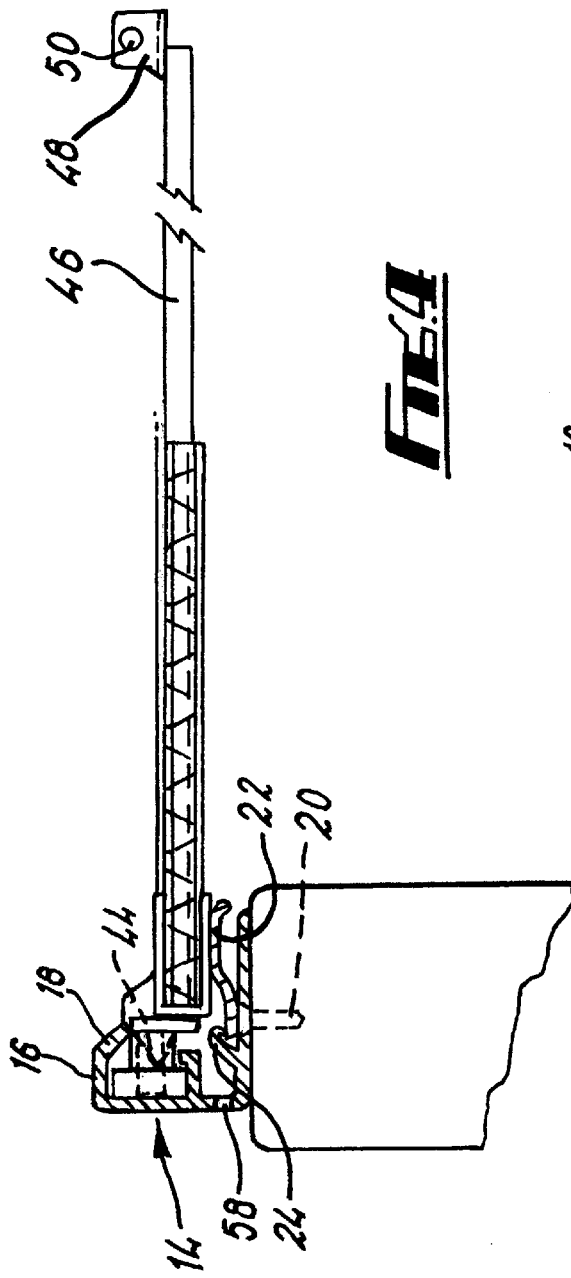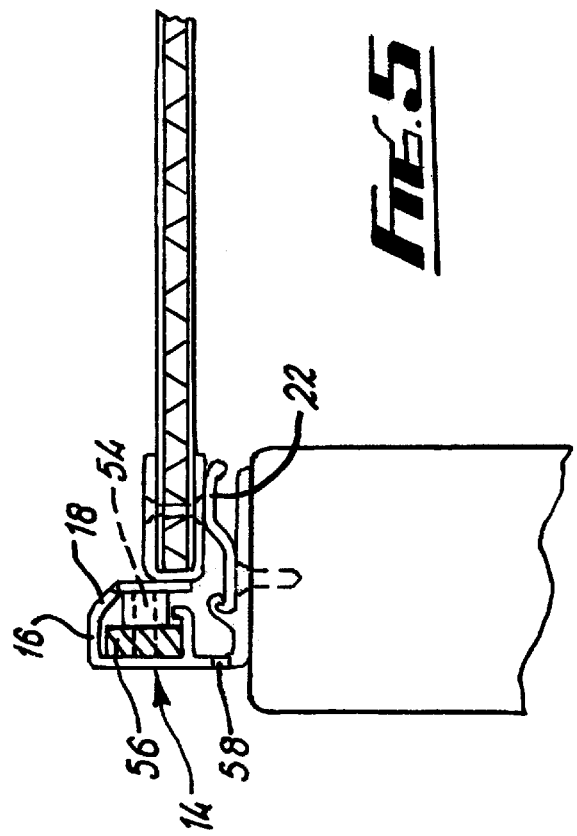

COVER APPARATUS

This application claims the benefit of U.S. Provisional Application No. 60/150,678, filed Aug. 25, 1999, now abandoned.

The invention relates to a cover apparatus, particularly but not exclusively a cover apparatus for use on a vehicle, and especially an apparatus for covering the load area or a pick-up truck.

Existing covers for vehicles such as pick-up trucks, generally consist of covers of a textile material such as canvas. Such covers have the disadvantage that they are prone to wear. Also, they do not offer any protection against theft or damage. Finally, these covers can only cover the load area completely or not at all. One piece panel covers are available which are generally pivotally mounted immediately behind the cab. These however do not readily facilitate loading of the truck from the side.

According to the present invention there is provided a cover apparatus, the apparatus comprising a pair of spaced track means, a plurality of interconnected covering elements which extend between the track means, the covering elements being sequentially interconnected such that each covering element extends respectively between the track means, each covering element being pivotally connected to an adjacent covering element, first and second pivotal connections being alternately provided between the covering elements, the first pivotal connection being slidable in the track means and the second pivotal connections being movable away from the track means, such that the apparatus is movable between a closed position wherein adjacent covering elements extend in a generally co-planar manner, and an open position wherein the covering elements are folded to lie substantially against each other extending away from the track means.

The respective pivotal connections may extend along opposite sides of the covering elements.

The first pivotal connection may comprise sliding members, each being engageable in a respective track means. The sliding member may comprise any of a wheel, plug or pin. The track means may comprise approximately C-shaped or inwardly facing channel sections, in which the sliding members are slidably moveable.

The second pivotal connections may comprise first locking members selectively engageable when locked with the track means so as to prevent the second pivotal connections from moving away from the track means, and hence preventing the apparatus from moving to an open position. The track means may comprise a formation or formations, with which the locking members can engage.

The pivotal connections, and desirably the second pivotal connections, may comprise a locking arrangement comprising means on adjacent covering elements which are lockable together to substantially prevent the respective covering elements from pivoting relative to each other.

The locking arrangement may comprise second locking members on each of the adjacent covering elements, which second locking members are selectively lockable together.

One or all of the second locking members on each second pivotal connection may be slidably moveable along the covering element towards or away from the track means. The second locking members may be spring urged into an unlocked position.

The first and second locking members may be provided by a single locking component. The locking components may comprise a finger which constitutes the first locking member interconnected to a locking formation which constitutes the second locking member. The finger and locking formation may be interconnected by a rigid member. Alignable holes may be provided in each of the locking formations, and a locking device such as a padlock may be selectively engageable through the aligned holes.

The track means may extend from fixed front and back points. The covering element extending from the front point may be provided with a front sealing arrangement, and said covering element is preferably permanently fixed to the front point. The front sealing arrangement may comprise a rubber seal. A cross member may extend between the track means at the front point. The cross member may be provided with a sealing arrangement. The covering element extending to the front point may be provided with connection means for allowing a restricted movement of the covering element along the track means. The connection means may comprise slots provided on each track means, and members provided on the covering element for engaging with the slots. The engaging members may comprise a plug and/or a pin.

Preferably the covering element extending to the back point is provided with a back sealing arrangement. The back sealing arrangement may comprise a flap. The flap may be provided with attachment means. The flap may engage with the track means. The flap may be releasably engageable with a fixture.

The first and second pivotal connections may comprise a hinge. The hinge may consist of a flexible material interconnecting the covering elements. The flexible material may comprise rubber or PVC.

The covering elements may comprise panels. The panels may comprise PVC and/or polyester. The covering elements may comprise a sandwich construction, and may have a foam or wood core construction.

The track means may comprise a flexible spring seal for supporting the covering elements. The flexible spring seal may be engageable between the covering elements and a part of the track means. The flexible spring seal may comprise any of rubber, a plastics material, PVC or polyester.

According to a further aspect of the invention there is provided a cover apparatus for the load area of a pick-up truck, the apparatus being according to any of the preceding twelve paragraphs.

According to another aspect of the invention there is provided a vehicle comprising a cover apparatus according to any of the preceding thirteen paragraphs.

The cover apparatus may be mounted to selectively cover the load area of the vehicle. The cover apparatus may be mounted to extend from the rear of a vehicle cab to the tailgate.

An embodiment of the present invention will now be described by way of example only and with reference to the accompanying drawings, in which:

FIG. 2 is a diagrammatic cross sectional view of part of the covering apparatus of FIG. 1;

FIG. 3 is a diagrammatic perspective view of a further part of the covering apparatus of FIG. 1;

FIG. 4 is diagrammatic cross sectional view of a still further part of the covering apparatus of FIG. 1; and FIG. 5 is a similar view to FIG. 4 of a yet further part of the covering apparatus of FIG. 1.

Figure 1:
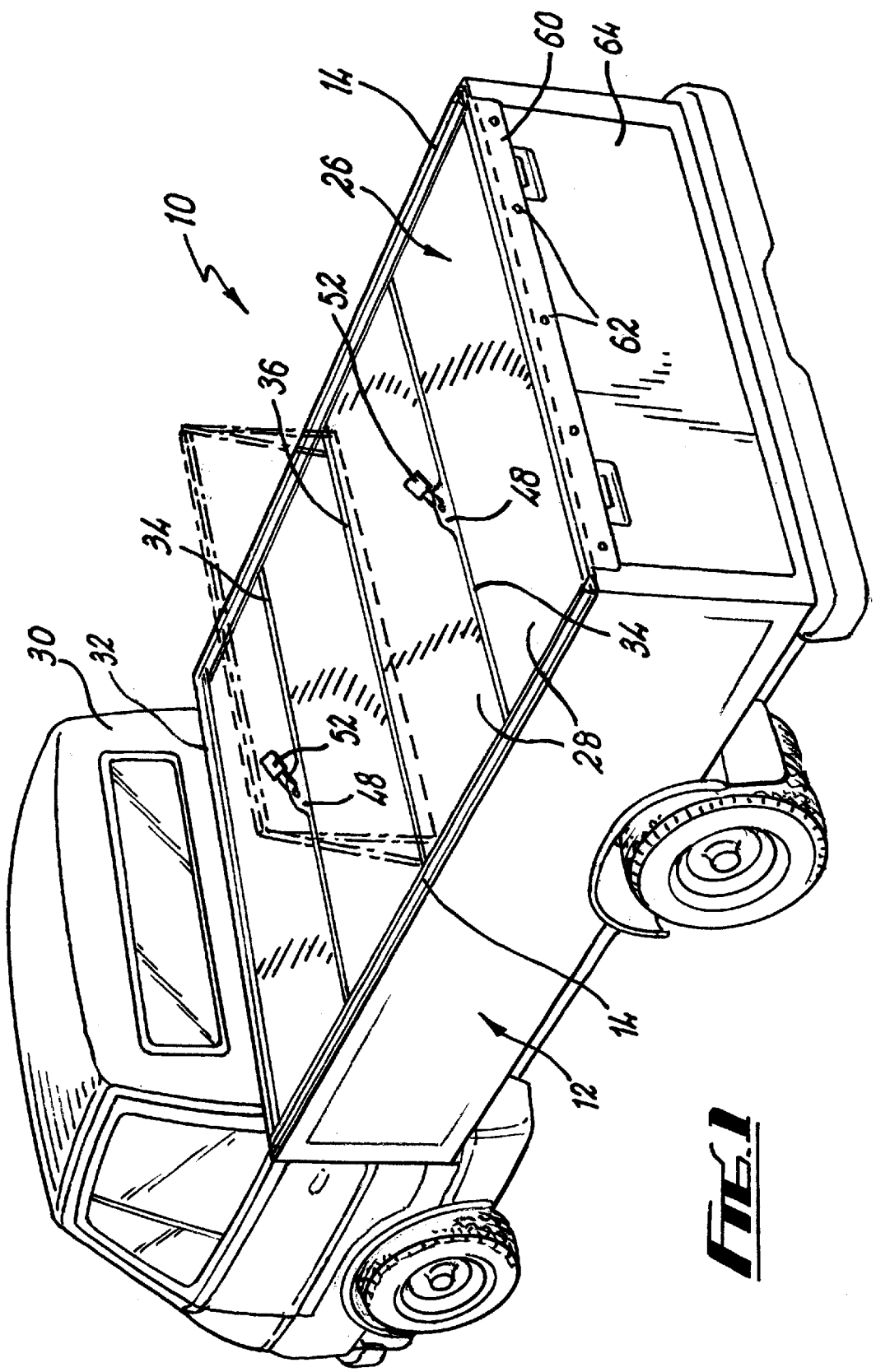
FIG. 1 is a diagrammatic rear perspective view of a pick-up truck fitted with a covering apparatus according to the invention.

The drawings show a cover apparatus 10 suitable for selectively covering the load area of a pick-up truck 12 (as shown in FIG. 1). The apparatus 10 comprises two track members 14 each mounted respectively along the top of each of the sides of the pick-up truck 12. Each track member 14 has a generally L-shaped cross-section with a long base on the L. An open channel section 16 is provided along the top part of the stem of the L facing into the load area. The inner top part 18 of the channel section 16 points downwardly and inwardly. The track members 14 are mounted to the pick-up truck 12 by a plurality of spaced screws 20. A sprung resilient member 22 is provided on the base of the L of the track members 14 and extends upwardly and transversely from a projection 24 towards the apex of the L of the track member.

The apparatus 10 also comprises a cover assembly 26 which in this instance comprises four pivotally interconnected panels 28. The panel 28 nearest the cab 30 of the truck 12 is pivotally mounted along its edge closet to the cab 30 and has a rubber seal 32 extending thereabove to prevent water ingress. A certain amount of play may be provided in this connection to permit ready pivoting of the panel 28. Thereafter the panels 28 are alternately connected by first and second connection arrangements 34, 36. Each of the arrangements 34, 36 permit relative pivoting between the panels 28. A hinge is provided between the panels 28 in the form of an extrusion 38 of a generally H-shaped cross-section which locates each panel 28 between respective side limbs and substantially abutting against the cross bar of the H.

The first connection arrangements as provided between the frontmost panel 28 and the next panel 28 is selectively raisable above the track members 14. As well as the extrusions 38 the first connection arrangement 34 comprises retaining members 40, one on each side of the arrangement. Each member 40 is slidably mounted on the arrangement 34 beneath a cover 42. At their outer ends the retaining members 40 have a finger 44 which is selectively engageable beneath the top part 18 of the track members 14. The finger 44 on each side of the connection arrangement is engageable with a respective different track member 14 to the other finger 44. The finger 44 connects by a rigid elongate member 46 to an upstanding tab 48 with a through hole 50. The retaining members 40 are arranged such that when the respective fingers 44 are engaging in the respective track members 14, the tabs 48 and hence holes 50 will be aligned with each other and can locate a lock such as a padlock 52 shown in FIG. 1. The retaining members 40 may be sprung to a position where the tabs 48 are not aligned and the fingers 44 are clear of the track members 14.

The second connection arrangements 36 are permanently located in the track member 14. The arrangements 14 comprise an axle 54 upon which a freely rotatable wheel 56 is mounted, the wheels 56 locating in the channel section 16. The resilient member 22 engages against the underside of the panels 28 to provide a substantially waterproof seal. Drain holes 58 are provided at spaced intervals in a lower outer part of the track members 14. A flap 60 is provided on the free end of the rearmost panel 28, and press-stud fasteners 62 are provided on the flap 60 which are engageable with corresponding parts on the tailgate 64 of the truck 12.

The panels 28 are made of a plastic board comprising upper and lower sheets interconnected by a plastics material matrix. Caps 66 are provided to close the edges of the panels 28.

To cover the load area of the pick-up 12 the apparatus 10 can take the condition shown in solid lines in FIG. 1. In this arrangement the fingers 44 engage in the track members 14, and hence the tabs 48 are aligned and can be locked together by padlocks 52. This therefore provides a secure and robust cover for the load area. To open part or all of the load area, the flap 60 is released using the fasteners 62. The first connection arrangement or arrangements 34 can then be released by undoing the padlock 52 and by allowing the tabs 48 to spring apart or moving them apart, such that the fingers 44 disengage from the tracks members. The sliding of the panels 28 together will cause folding upwardly of the first connection arrangement as shown by dotted lines in FIG. 1. This could be achieved for the rear two, or all four of the panels 28.

There is thus described a cover apparatus of relatively straightforward construction, which provides a secure and robust cover for part or all of the load area which can readily be opened. The use of the panels also provides for a lightweight cover.

Various modifications made be made without departing from the scope of the invention. For instance, a different number of panels may be provided. Different hinge arrangements could be provided between the panels. Also, different connection arrangements may be used. It may for instance be that the fingers engaging in the track could be dispensed with if sufficient retention was provided by a padlock through the aligned holes. Whilst the invention is described in respect of a pick-up truck, it could be used in a wide range of different applications.

Whilst endeavouring in the foregoing specification to draw attention to those features of the invention believed to be of particular importance it should be understood that the Applicant claims protection in respect of an patentable feature or combination of features hereinbefore referred to and/or shown in the drawings whether or not particular emphasis has been placed thereon.

What is claimed is:

1. A cover apparatus, the apparatus comprising a pair of spaced track means, a plurality of interconnected covering elements which extend between the track means, means sequentially interconnecting said covering elements such that each said covering element extends respectively between the track means, means pivotally connecting each said covering element to an adjacent covering element to provide first and second pivotal connections alternately therebetween, said first pivotal connections being slidable in the track means, whilst second pivotal connections are selectively movable away from the track means, such that said apparatus is movable between a closed position wherein adjacent said covering elements extend in a generally co-planar manner, and an open position where said covering elements are folded to lie substantially against each other extending away from the track means, said second pivotal connections comprising first locking member selectively engageable when locked with said track means so as to prevent said second pivotal connections from moving away from said track means, and hence preventing the apparatus from moving to an open position.

2. The cover apparatus according to claim 1, wherein said covering elements have opposite sides, and said respective pivotal connections extend along said opposite sides.

3. The cover apparatus according to claim 1, wherein each said first pivotal connection comprises sliding members, each said sliding member being engage able in a respective track means.

4. The cover apparatus according to claim 3, wherein said sliding members comprise any of a wheel, plug, or pin.

5. The cover apparatus according to claim 3, wherein the track means comprise approximately C-shaped or inwardly facing channel sections, in which said sliding members are slidably moveable.

6. The cover apparatus according to claim 1, wherein said track means comprise a formation with which said locking members can engage.

7. The cover apparatus according to claim 1, wherein the first locking members on each pivotal connections are slidably moveable along the covering element towards or away from the track means.

8. The cover apparatus according to claim 7, wherein means are provided for spring urging the first locking members into an unlocked position.

9. The cover apparatus according to claim 1, comprising fixed front and back points, said respective track means extend between said points.

10. The cover apparatus according to claim 9, wherein a front covering element extends from the front point and is provided with a front sealing arrangement.

11. The cover apparatus according to claim 10, wherein means are provided for fixing said front covering element to said front point.

12. The cover apparatus according to claim 9, wherein a covering element is extendable to the back point and is provided with a back sealing arrangement.

13. The cover apparatus according to claim 1, wherein said first and second pivotal connections each comprise a hinge.

14. The cover apparatus according to claim 13, wherein said hinge comprises a flexible material interconnecting said covering elements.

15. The cover apparatus according to claim 1, wherein said covering elements comprises panels.

16. The cover apparatus according to claim 1, wherein said track means comprise a flexible spring seal for supporting said covering elements.

17. A cover apparatus, the apparatus comprising a pair of spaced track means, a plurality of interconnected covering elements which extends between the track means, means sequentially interconnecting said covering elements such that each said covering element extends respectively between the track means, means pivotally connecting each said covering element to an adjacent covering element to provide first and second pivotal connections alternately therebetween, said first pivotal connections are selectively movable away from the track means, such that said apparatus is movable between a closed position wherein adjacent said covering elements extend in a generally co-planar manner, and an open position where said covering elements are folded to lie substantially against each other extending from the track means, said pivotal connections comprising a locking arrangement comprising means on adjacent covering elements which are lockable together to substantially prevent said respective covering elements from pivoting relative to each other.

18. The cover apparatus according to claim 17, wherein said second pivotal connections comprise said locking arrangement.

19. The cover apparatus according to claim 17, wherein said locking arrangement comprises second locking members on each of the adjacent covering elements, which second locking members are selectively likable together.

20. A cover apparatus, the apparatus comprising a pair of spaced track means, a plurality of interconnected covering elements which extend between the track means, means sequentially interconnecting said covering elements such that each said covering element extends respectively between the track means, means pivotally connecting each said covering element to an adjacent covering element to provide first and second pivotal connections alternately therebetween, said first pivotal connections are selectively movable away from the track means, such that said apparatus is movable between a closed position wherein adjacent said covering elements extend in a generally co-planar manner, and an open position where said covering elements are folded to lie substantially against each other extending from the track means, a locking component is on each of adjacent covering elements which said locking components are likable together to substantially prevent said respective covering elements from pivoting relative to each other, said locking components also being selectively engageble when locked with said track means so as to prevent said second pivotal connections from moving away from said track means.

21. The cover apparatus according to claim 20, wherein said locking components comprise a finger which is selectively engage able with said track means, and is interconnected to a locking formation which is likable to a locking formation on an adjacent said covering element.

22. The cover apparatus according to claim 21, wherein said finger and locking formation are interconnected by a rigid member.

23. The cover apparatus according to claim 21, wherein alienable holes are provided in each of the locking formations.

24. A cover apparatus for a load are of a pick-up truck, said apparatus comprising a pair of spaced track means, each mountable along a side of the truck, a plurality of interconnected covering elements extendible between the track means, means sequentially interconnecting said covering elements such that each said covering element extends respectively between the track means, means pivotally connecting each said covering element to an adjacent covering element to provide first and second pivotal connections alternately therebetween, said first pivotal connections being slidable in the track means, whilst said second pivotal connections are movable away from the track means, such that said apparatus is movable between a closed position covering the load area wherein adjacent said covering elements extend in a generally co-planar manner, and an open position permitting access to the load area where said covering elements are folded to lie substantially against each other extending upwardly away from the track means, said second pivotal connections comprising first locking members selectively engageable when locked with said track means so as to prevent said second pivotal connections from moving away from said track means, and hence preventing the apparatus from moving to an open position.

25. In combination a pick up truck and a cover apparatus for a load area of the pick up truck, said cover apparatus comprising a pair of spaced track means each extendible along a side of the truck, a plurality of interconnected covering elements which extend between the track means, means sequentially interconnecting said covering elements such that each said covering element extends respectively between the track means, means pivotally connecting each said covering element to an adjacent covering element therebetween, said first pivotal connections being slidable in the track means, whilst said second pivotal connections are movable away from the track means, such that said apparatus is movable between a closed position covering the load area wherein adjacent said covering elements extend in a generally co-planar manner, and an open position permitting access to the load area where said covering elements are folded to lie substantially against each other extending upwardly away from the track means, said second pivotal connections comprising first locking members selectively engageable when locked with said track means so as to prevent said second pivotal connections from moving away from said track means, and hence preventing the apparatus from moving to an open position.

* * * * *